Sept. 9, 1947. H. KIHN 2,427,215
FREQUENCY MODULATED VELOCITY-DISTANCE MEASUREMENT SYSTEM
Filed May 9, 1945
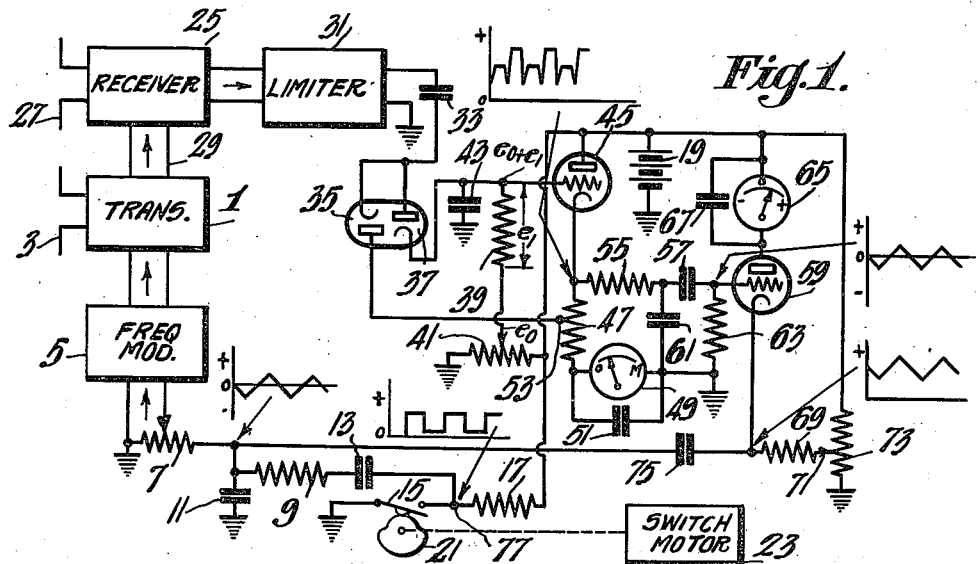
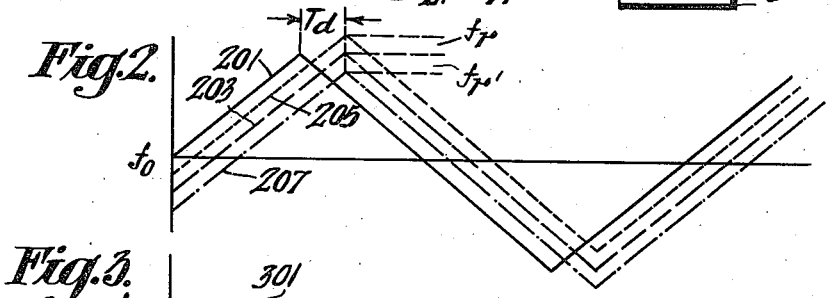
INVENTOR.
Harry Kihn
BY
ATTORNEY Patented Sept. 9, 1947

2,427,215

UNITED STATES PATENT OFFICE 2,427,215

FREQUENCY MODULATED VELOCITY-DISTANCE MEASUREMENT SYSTEM

Harry Kihn, Lawrenceville, N. J., assignor to Radio Corporation of America, a corporation of Delaware Application May 9, 1945, Serial No. 592,806

7 Claims. (Cl. 250—1.56)

This invention relates to radio devices, and more particularly to systems for measuring distance and velocity by means of reflected frequency modulated radio signals.

The principal object of the invention is to provide an improved method of and means for measuring the distance and velocity of an aircraft or the like with respect to a reflecting object, such as another craft, a target, or the surface of the earth.

Another object of this invention is to provide an improved system of the described type including means for indicating whether the distance is increasing or decreasing.

A further object of the invention is to provide an improved radio altimeter system which will afford an indication of rate of climb, as well as an indication of altitude.

The invention will be described with reference to the accompanying drawing, in which:

Figure 1 is a schematic diagram of a radio reflection system embodying the instant invention, Figure 2 is a graph illustrating variations with time of the frequencies of typical signals transmitted and received in the operation of the system of Figure 1, Figure 3 is a graph illustrating the variation with time of the frequency of a beat signal produced in the operation of the system of Figure 1, and also the variations in amplitude of a voltage derived from said beat signal, Figure 4 is a graph similar to Figure 3 but showing the conditions of decreasing distance, and Figure 5 is a graph similar to Figure 4 but showing the conditions of increasing distance.

Refer first to Figure 1. A transmitter 1 is provided with an antenna 3, and is connected to a frequency modulator 5. The modulator 5 may be of the type described in copending U. S. application Ser. No. 471,003, filed January 1, 1943, by S. V. Perry and entitled Capacity modulator unit, or any other known device for varying the frequency of operation of the transmitter 1 in accordance with an applied voltage. The modulator 5 is coupled through an adjustable voltage divider 7 to a wave shaping circuit comprising a resistor 9 and a capacitor 11. The resistor 9 is coupled through a capacitor 13 to one terminal of a switch 15.

The switch 15 is connected through a resistor 17 to the positive terminal of a D.-C. source 19. The switch 15 is arranged to be cyclically opened and closed by means of a cam 21 continuously driven by a motor 23.

A receiver 25 is provided with an antenna 27 and is coupled through a line 29 to the transmitter 1. The output circuit of the receiver 25 is connected to an amplitude limiter 31. The output circuit of the limiter 31 is connected to a frequency responsive counter circuit including a capacitor 33, a pair of diodes 35 and 37 and a load resistor 39. The cathode of the diode 35 and the anode of the diode 37 are coupled through the capacitor 33 to the limiter 31. The cathode of the diode 37 is connected to one end of the load resistor 39. The other end of the resistor 39 is connected to an adjustable voltage divider 41, which is connected across the source 19.

A capacitor 43 is connected from the upper end of the resistor 39 to ground. The upper end of the load resistor 39 is also connected to the control grid of an election discharge tube 45. The entire load for the tube 45 is connected in the cathode circuit, and includes a resistor 47 and a D.-C. meter 49. The meter 49 is by-passed by a capacitor 51. The anode of the diode 35 is connected to an intermediate point 53 on the resistor 47.

The cathode of the tube 45 is coupled through a resistor 55 and a blocking capacitor 57 to the control grid of an electron discharge tube 59. A capacitor 61 is connected from the junction between the resistor 55 and capacitor 57 to ground. A grid leak resistor 63 is connected from the control grid of the tube 59 to ground. The anode circuit of the tube 59 includes a D.-C. meter 65, bypassed by a capacitor 67. The cathode of the tube 59 is connected through a resistor 69 to the adjustable tap 71 of the voltage divider 73. The voltage divider 73 is connected across the source 19. The cathode of the tube 59 is also coupled through a capacitor 75 to the wave shaping circuit 9, 11.

The adjustment and operation of the above described system is as follows: The motor 23 rotates the cam 21 continuously, causing the switch 15 to open and close at intervals, of for example, .01 second. When the switch 15 is closed, the end 77 of the resistor 17 which is connected thereto is grounded, and the voltage at the point 77 is substantially zero with respect to ground potential. When the switch 15 is open, substantially no current flows through the resistor 17 and the potential at the point 77 becomes equal to that of the D.-C. source 19. Thus as the switch 15 is operated cyclically, the voltage at the point 77 changes discontinuously between two values, providing a pulsating voltage of square wave form.

The square wave voltage appearing at the point 77 is applied through the capacitor 13 to the resistor 9. The capacitor 13 serves to block the D.-C. component of the square wave voltage. The A.-C. component is applied through the resistor 9 to the capacitor 11. The resistor 9 and the capacitor 11 are so proportioned that their time constant is much greater than the period of operation of the switch 15. This causes the square wave voltage to be integrated, providing a voltage of substantially triangular wave form across the capacitor 11.

The triangular wave voltage is attenuated to a certain extent by the voltage divider 7 and is applied to the frequency modulator 5. The modulator 5 varies the frequency of operation of the transmitter 1 as a triangular wave function. The range of variation of frequency is determined by the setting of the voltage divider 7. Referring to Figure 2, the frequency of the output of the transmitter 1 varies as indicated by the solid line 201.

A small portion of the output of the transmitter 1 is applied directly to the receiver 25, through the line 29. The major portion of the transmitter output is radiated by the antenna 3, toward the object whose distance and relative velocity is to be measured. Part of the radiated energy is reflected by this object back to the receiver antenna 27.

The received signal varies in frequency like the transmitted signal, but the variations are delayed by the time $T_d$ required for the waves to travel to the reflecting object and back to the receiving antenna 27. If there is no relative velocity between the reflecting object and the antennas 3 and 27, the range of frequency variation of the received signal is identical with that of the transmitted signal. The frequency of the received signal as a function of time under this condition is shown by the dash line 203 in Figure 2.

The received signal is mixed in the receiver 25 with the signal transferred directly over the line 29, providing a beat signal. One component of the beat signal has a frequency equal to the difference in the frequencies of the two inputs to the receiver 25. The frequency of the beat signal as a function of time, under the condition of zero relative velocity, is illustrated by the line 301 of Figure 3. It is apparent that this frequency is constant, except for the brief "turn around" periods when the direction of variation of the transmitter frequency reverses. These periods are greatly exaggerated in the drawing, and in actual practice are of the order of one one thousandth of the modulation period. The beat frequency is proportional to the delay $T_d$ and hence is directly proportional to the distance.

The limiter 31 limits the beat frequency signal voltage to a constant amplitude. The output of the limiter 31 is applied to the diodes 35 and 37 through the capacitor 33. During positive half cycles of the limiter output, the capacitor 33 is charged in one polarity through the diode 37. The charging current flows through the load resistor 39. During negative half cycles of the limiter output, the capacitor 33 is discharged, and charged in the opposite polarity, through the diode 35. This current does not flow through the load resistor 39.

The above described sequence occurs during each beat frequency cycle. The charge deposited in the capacitor 33 during each half cycle is substantially independent of frequency. Thus the current through the diode 37 comprises a series of equal current pulses, occurring at the beat frequency. The average current through the load resistor is proportional to the number of pulses per second, and therefore is proportional to the beat frequency. The capacitor 43 integrates the current pulses to provide a relatively smooth direct current through the resistor 39. The voltage drop $e_1$ across the resistor 39 is proportional to the current, and hence to the beat frequency.

The voltage divider 41 provides at its tap a voltage $e_0$ of, for example, 70 volts with respect to ground potential. The voltage at the upper end of the load resistor is thus $e_0+e_1$. This voltage is applied to the control grid of the tube 45. The anode current of the tube 45 assumes a value such that the drop in its load circuit, which comprises the resistor 47 and the meter 49, is substantially the same as the voltage between the control grid and ground. The voltage at the cathode of the tube 45 is therefore $e_0+e_1$.

The anode of the counter discharge diode 35 is returned to the point 53 on the resistor 47. This maintains the anode of the diode 35 at a potential which is slightly negative with respect to that at the cathode of the diode 37, so that the charge deposited in the capacitor 33 during each beat frequency cycle is substantially independent of the voltage $e_0+e_1$ at the upper end of the load resistor 39.

The average current through the resistor 47 and the meter 49 is the anode current of the tube 45, and is proportional to $e_0+e_1$. The meter 49 is calibrated in units of distance, such as feet, and adjusted to read zero when the counter output voltage $e_1$ is that corresponding to zero distance. The deflection of the meter 49 will then be directly proportional to the distance.

In the foregoing description of the operation, it has been assumed that there was no relative velocity. If the distance is decreasing, the frequency of the received signals will be increased as a result of Doppler effect. The frequency of the received signal under this condition is shown by the dot line 205 in Figure 2. The Doppler increase is indicated as $f_r$, and is directly proportional to the velocity.

The beat signal varies in frequency as shown by the line 401 in Figure 4. It is evident that the beat frequency is lower than its average value by the amount $f_r$ during increase of the transmitted frequency, and higher by the same amount during decrease of transmitted frequency. The average beat frequency indicated by the dash line 403, is proportional to the distance. The range of variation of the beat frequency, $2f_r$, is proportional to the velocity.

The counter circuit operates in the same manner as described above, providing an output voltage proportional to the beat frequency. The average current through the tube 45 and the meter 49 is, as before, proportional to the distance. The speed-proportional variations in this current are bypassed by the capacitor 51, and so do not affect the reading of the meter 49.

The voltage at the cathode of the tube 45 varies with the beat frequency, like the line 401 of Figure 4. This voltage is $e_0$ plus the counter output voltage $e_1$, and is applied to the capacitor 61 through the resistor 55. The values of the capacitor 61 and the resistor 55 are so proportioned that the variations are integrated, providing a wave or triangular-topped form, as indicated by the dot line 405 of Fig. 4. The blocking capacitor 57 removes the D.-C. component ($e_0$ plus the average value of $e_1$), so that the triangular wave A.-C. component is applied to the control grid of the tube 59.

Triangular wave voltage from the modulator circuit is applied through the capacitor 75 to the cathode of the tube 59. An adjustable bias voltage is also applied to the cathode from the tap 71 of the voltage divider 73. The voltage between control grid and cathode of the tube 59 is thus the triangular wave voltage derived from the counter output, less the triangular wave derived from the modulating circuit, and the bias. This difference will vary in accordance with variations in the amplitude of the speed-proportional triangular wave from the counter output.

The tap 71 is adjusted to bias the tubes 59 so as to operate over a substantially linear portion of its grid voltage-plate current characteristic. The meter 65 is adjusted to provide a half scale deflection with the control grid of the tube 59 at ground potential. The scale is calibrated in terms of velocity, positive in one direction and negative in the other direction from the mid-scale point.

Under the condition of decreasing distance, the beat frequency is lower than its average value during increase of transmitter frequency and higher during decrease of transmitter frequency. The triangular wave voltage derived from the counter output is thus decreasing when the modulator voltage is increasing, and vice versa. In other words, the two triangular wave voltages applied to the tube 59 are approximately 180 degrees out of phase. The average voltage between the control grid and anode is greater than under static conditions, and the average anode current is correspondingly less. The meter 65 will therefore indicate negative velocity, corresponding to decreasing distance.

When the distance is increasing the reflected wave is decreased in frequency by Doppler effect. The frequency of the received signal varies as shown by the dot-dash line 207 in Figure 2. The beat frequency varies as shown by the line 501 of Figure 5. The triangular wave applied to the grid of the tube 59 is represented by the dash line 505. This is seen to be in phase with the modulating wave. The average voltage between the control grid and anode of the tube 59 is less than under static conditions, and the meter 65 indicates positive velocity.

Although a specific embodiment of the invention has been described, it will be apparent to those skilled in the art that various other circuit arrangements may be employed in the practice of the invention. For example, other known frequency responsive circuits may be substituted for the described counter. The cathode follower amplifier 45 may be replaced by other conventional D.-C. amplifier means. The comparison of the two triangular wave voltages, which are applied to the tube 59 in the present illustration, may be effected by any of several well known arrangements.

Briefly summarizing the foregoing description, the present invention contemplates the measurement of relative velocity of a reflecting object by means of frequency modulated radio signals, which are radiated to and received after reflection by the object, providing a beat signal whose frequency varies periodically through a range depending upon the velocity. The beat signal is converted to a voltage similar in wave shape to the modulating voltage, but with an amplitude which varies in accordance with the velocity and polarity or phase which depends upon whether the velocity is positive (increasing distance) or negative. This voltage is compared with the modulating voltage to operate a velocity indicator.

I claim as my invention:

1. The method of measuring velocity with respect to a reflecting object, comprising the steps of transmitting a signal to said object, generating a modulating voltage of substantially triangular wave form, cyclically varying the frequency of said signal in response to said modulating voltage, receiving said signal after reflection, combining said received signal with said transmitted signal to produce a beat frequency signal of cyclically changing frequency, producing in response to variation in frequency of said beat signal a voltage of correspondingly changing magnitude, separating from said last mentioned voltage an alternating component voltage, modifying the wave form of said alternating component voltage to a substantially triangular shape, comparing said modified alternating voltage with said modulating voltage to provide a resultant voltage, and indicating the magnitude of said resultant voltage.

2. The method of measuring velocity with respect to a reflecting object, comprising the steps of transmitting a signal to said object, generating a periodically varying modulating voltage, cyclically varying the frequency of said signal in response to said modulating voltage, receiving said signal after reflection, combining said received signal with said transmitting signal to produce a beat frequency signal of cyclically changing frequency, producing in response to variation in frequency of said beat signal a voltage of correspondingly changing magnitude, separating from said last mentioned voltage an alternating component voltage, modifying the wave form of said alternating component voltage to a wave shape substantially the same as that of said modulating voltage, comparing said modified alternating voltage with said modulating voltage to provide a resultant voltage, and indicating the magnitude of said resultant voltage.

3. A system for measuring velocity with respect to a reflecting object including a transmitter, means for generating a cyclically varying modulating voltage, frequency modulator means connected to said transmitter, means for applying said modulating voltage to said modulator, receiver means coupled to said transmitter to provide a beat frequency output in response to reflection of signals radiated by said transmitter, frequency responsive means coupled to said receiver to provide an output voltage varying in magnitude in accordance with variation in the frequency of said beat frequency output, means for separating from said output voltage the alternating component thereof, means for modifying the wave shape of said alternating component to substantially the same as that of said modulating voltage, an electron discharge device, means for applying said modulating voltage and said modified alternating component to said electron discharge device, and means for measuring the current produced in said device by the combined effects of said applied voltages.

4. A system for measuring velocity with respect to a reflecting object including a transmitter, means for generating a cyclically varying modulating voltage, frequency modulator means connected to said transmitter, means for applying said modulating voltage to said modulator, receiver means coupled to said transmitter to provide a beat frequency output in response to reflection of signals radiated by said transmitter, frequency responsive means coupled to said receiver to provide an output voltage varying in magnitude in accordance with variation in the frequency of said beat frequency output, means for separating from said output voltage the alternating component thereof, means for modifying the wave shape of said alternating component to substantially the same as that of said modulating voltage, a voltage responsive variable impedance device, means for applying said modulating voltage and said modified alternating component to said impedance device, and means for measuring the current produced in said device by the combined effects of said applied voltages.

5. A system for measuring velocity with respect to a reflecting object including a transmitter, means for generating a cyclically varying modulating voltage, frequency modulator means connected to said transmitter, means for applying said modulating voltage to said modulator, receiver means coupled to said transmitter to provide a beat frequency output in response to reflection of signals radiated by said transmitter, frequency responsive means coupled to said receiver to provide an output voltage varying in magnitude in accordance with variation in the frequency of said beat frequency output, means for separating from said output voltage the alternating component thereof, means for modifying the wave shape of said alternating component to substantially the same as that of said modulating voltage, and indicator means responsive to the difference between said modulating voltage and said modified alternating component voltage.

6. The method of measuring distance and velocity with respect to a reflecting object, comprising the steps of transmitting a signal to said object, generating a periodically varying modulating voltage, cyclically varying the frequency of said signal in response to said modulating voltage, receiving said signal after reflection, combining said received signal with said transmitted signal to produce a beat frequency signal of cyclically changing frequency, producing in response to said beat signal a voltage of magnitude proportional to the frequency thereof, separating from said last mentioned voltage a direct component thereof, indicating the magnitude of said direct component in terms of distance, separating from said frequency-proportional voltage an alternating component voltage, modifying the wave form of said alternating component voltage to a substantially triangular shape, comparing said modified alternating voltage with said modulating voltage to provide a resultant voltage, and indicating the magnitude of said resultant voltage.

7. A system for measuring distance and velocity with respect to a reflecting object, including a transmitter, means for generating a cyclically varying modulating voltage, frequency modulator means connected to said transmitter, means for applying said modulating voltage to said modulator, receiver means coupled to said transmitter to provide a beat frequency output in response to reflection of signals radiated by said transmitter, frequency responsive means coupled to said receiver to provide an output voltage of magnitude proportional to the frequency of said beat frequency output, means for separating from said output voltage the direct component thereof, means for indicating the magnitude of said direct component in terms of distance, means for separating from said output voltage the alternating component thereof, means for modifying the wave shape of said alternating component to substantially the same as that of said modulating voltage, and means for indicating the difference between said modulating voltage and said modified alternating component voltage in terms of velocity.

HARRY KIHN.

REFERENCES CITED

The following references are of record in the file of this patent:

UNITED STATES PATENTS

| Number | Name | Date |
| --- | --- | --- |
| 2,402,464 | Suter | June 18, 1946 |
| 2,268,587 | Guanella | Jan. 6, 1942 |